(12) United States Patent
Han et al.

(10) Patent No.: US 7,347,312 B2
(45) Date of Patent: Mar. 25, 2008

(54) DISTRIBUTION SYSTEM AND METHOD OF OPERATING THE SAME

(75) Inventors: Jae-Yong Han, Seoul (KR); Jun-Ho Cheong, Gyeongsangnam-do (KR); Byung-Woo Jung, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 391 days.

(21) Appl. No.: 11/100,992

(22) Filed: Apr. 6, 2005

(65) Prior Publication Data

US 2005/0274588 A1    Dec. 15, 2005

(30) Foreign Application Priority Data

Apr. 8, 2004    (KR)    ............ 10-2004-0024070

(51) Int. Cl.
*B65G 37/00*    (2006.01)

(52) U.S. Cl. ............... 198/346.2; 198/346.3; 414/797

(58) Field of Classification Search .......... 414/797, 414/797.2; 198/346.2, 346.3, 890.1, 369.1, 198/436, 597, 457.01, 463.2, 347.4; 209/658, 209/643

See application file for complete search history.

(56) References Cited

U.S. PATENT DOCUMENTS

| | | | | |
|---|---|---|---|---|
| 4,287,980 A | * | 9/1981 | Montferme | 198/419.3 |
| 4,493,939 A | * | 1/1985 | Blaske et al. | 136/212 |
| 4,678,172 A | * | 7/1987 | Faltin | 270/18 |
| 4,697,318 A | * | 10/1987 | Wickham et al. | 29/33 P |
| 4,753,103 A | * | 6/1988 | Braun | 72/405.1 |
| 5,024,315 A | * | 6/1991 | Ward | 198/341.08 |
| 5,269,646 A | * | 12/1993 | Focke | 414/796.2 |
| 5,427,252 A | * | 6/1995 | Teegarden et al. | 209/540 |
| 5,520,107 A | * | 5/1996 | Airoldi | 101/35 |
| 5,696,688 A | * | 12/1997 | Leif et al. | 700/117 |
| 6,643,917 B1 | * | 11/2003 | Gieskes | 29/740 |
| 6,786,328 B2 | * | 9/2004 | Honegger | 198/890.1 |
| 6,840,176 B1 | * | 1/2005 | Armoni | 101/477 |
| 7,000,755 B2 | * | 2/2006 | van Pinxteren et al. | 198/374 |
| 7,032,304 B2 | * | 4/2006 | Gieskes | 29/832 |
| 7,047,710 B2 | * | 5/2006 | Winkler | 53/540 |
| 7,077,262 B2 | * | 7/2006 | Kabeshita et al. | 198/817 |

\* cited by examiner

*Primary Examiner*—Douglas A Hess
(74) *Attorney, Agent, or Firm*—MacPherson Kwok Chen & Heid LLP; David S. Park

(57) ABSTRACT

An improved distribution system and method of operating the same are provided. In one embodiment, the distribution system includes a plate for loading a plurality of substrates thereon, a first transfer assembly for transferring the substrates from the plate to a conveyer, and a distribution assembly for distributing the substrates transferred by the conveyer to a first testing assembly and a second testing assembly. The distribution assembly includes a first sub-conveyer and a second sub-conveyer, and the outlet of one of the first sub-conveyer and the second sub-conveyer corresponds to the inlet of one of the first testing assembly and the second testing assembly.

19 Claims, 16 Drawing Sheets

DISTRIBUTION SYSTEM AND METHOD OF OPERATING THE SAME

BACKGROUND (a) Field of the Invention

The present invention relates generally to a distribution system and a method of operating the same and, more particularly, to a substrate distribution system for manufacturing a liquid crystal display (LCD).

(b) Description of the Related Art

Liquid crystal displays (LCDs) have become one of the most widely used flat panel displays. Generally, an LCD includes a pair of panels individually having electrodes on their inner surfaces, and a dielectric anisotropy liquid crystal layer interposed between the panels. Varying the voltage difference between the field generating electrodes, i.e., varying the strength of an electric field generated by the electrodes, changes the transmittance of the light passing through the LCD, and thus desired images may be obtained by controlling the voltage difference between the electrodes.

An LCD manufacturing process includes three main processes: a panel manufacturing process, a cell manufacturing process, and a module process.

The panel manufacturing process produces thin film transistor (TFT) panels and color filter panels using treated glass substrates. In more detail, in one example of the TFT panel manufacturing process, a plurality of TFTs and a plurality of pixel electrodes are formed on the lower panel. In one example of the color filter panel manufacturing process, dye or pigment filter materials of red (R), green (G), and blue (B) are deposited on the inside of the upper panel having a black matrix to form R, G, and B color filter layers, and indium tin oxide (ITO) material is also deposited on the interior of the upper panel to form common electrodes.

The cell manufacturing process includes several process steps. First, in order to create a uniform distance between both glass panels, spacers are sprayed on one panel. Then, the TFT panel and the color filter panel are combined to form a panel assembly, which is divided into a plurality of cells. Each cell is then filled with liquid crystal.

The module process forms circuitry for signal processing and connects the circuitry to the panels, thereby completing a module.

The cell manufacturing process includes cutting of a large-size mother panel. That is, the mother panel is scribed and cut into a plurality of cells having final display dimensions by a scribing process. After the scribing process, the cells are distributed to a subsequent grinding process.

However, as the number of cells cut from one mother panel increases, the distribution system has a serious bottleneck problem as the tact time of the scribing system becomes smaller than that of the distribution system. Also, as the manufacturing process of the LCD proceeds, the difference between the tact times of the two systems is continuously accumulated, causing a more serious bottleneck.

Furthermore, since the number of cells cut from a mother panel may increase as the panel size becomes larger, bottleneck becomes a more serious concern in this case. Also, as the manufacturing equipment becomes larger, the transfer distance of the transfer device increases, so that the bottleneck becomes more serious.

Therefore, as improved distribution system and method of operating the same are highly desirable.

SUMMARY

The present invention provides a distribution system capable of reducing a tact time and advantageously reducing or eliminating the bottleneck phenomenon.

In accordance with one embodiment of the present invention, a distribution system is provided, the system including: a first transfer assembly for transferring substrates from a plate to a conveyer; and a distribution assembly for distributing the substrates transferred by the conveyer to a first testing assembly or a second testing assembly. The distribution assembly includes a first sub-conveyer and a second sub-conveyer, an outlet of one of the first sub-conveyer and the second sub-conveyer corresponding to an inlet of one of the first testing assembly and the second testing assembly.

In accordance with another embodiment of the present invention, a method for operating a distribution system including a distribution assembly having a first sub-conveyer and a second sub-conveyer is provided, the method comprising: providing a first transfer assembly on a first substrate which is disposed on a plate; transferring the first substrate to a conveyer using the first transfer assembly; transferring the first substrate to the first sub-conveyer when an outlet of the conveyer corresponds to an inlet of the first sub-conveyer, while substantially simultaneously moving the first transfer assembly onto a second substrate; vertically moving the distribution assembly so that an outlet of the first sub-conveyer corresponds to an inlet of a first testing conveyer and an inlet of the second sub-conveyer corresponds to the outlet of the conveyer, while substantially simultaneously transferring the second substrate to the conveyer using the first transfer assembly; and horizontally transferring the first substrate to the first testing conveyer for subsequent processing.

In accordance with yet another embodiment of the present invention, a method for operating a distribution system which includes a distribution assembly having a first sub-conveyer and a second sub-conveyer is provided, the method comprising: providing a first transfer assembly on a first substrate and a second substrate; suction engaging the first substrate and the second substrate using a vacuum pad of the first transfer assembly and transferring the first substrate and the second substrate to a conveyer; disposing the first substrate on the conveyer by releasing the suction engaging the first substrate; transferring the first substrate to the first sub-conveyer when an outlet of the conveyer corresponds to an inlet of the first sub-conveyer; disposing the second substrate on the conveyer by releasing the suction engaging the second substrate, and substantially simultaneously moving the first transfer assembly onto a third substrate and a fourth substrate; vertically moving the distribution assembly so that an outlet of the first sub-conveyer corresponds to an inlet of a first testing conveyer while an inlet of the second sub-conveyer corresponds to the outlet of the conveyer; and horizontally transferring the first substrate to the first testing conveyer for subsequent processing.

The above objects and other advantages of the present invention will become more apparent by describing the embodiments thereof in more detail with reference to the accompanying drawings.

DETAILED DESCRIPTION

Distribution systems and methods according to embodiments of the present invention will now be described in detail with reference to the accompanying drawings. The present invention may, however, be embodied in different forms and should not be construed as being limited to the embodiments set forth herein.

Figure 1:
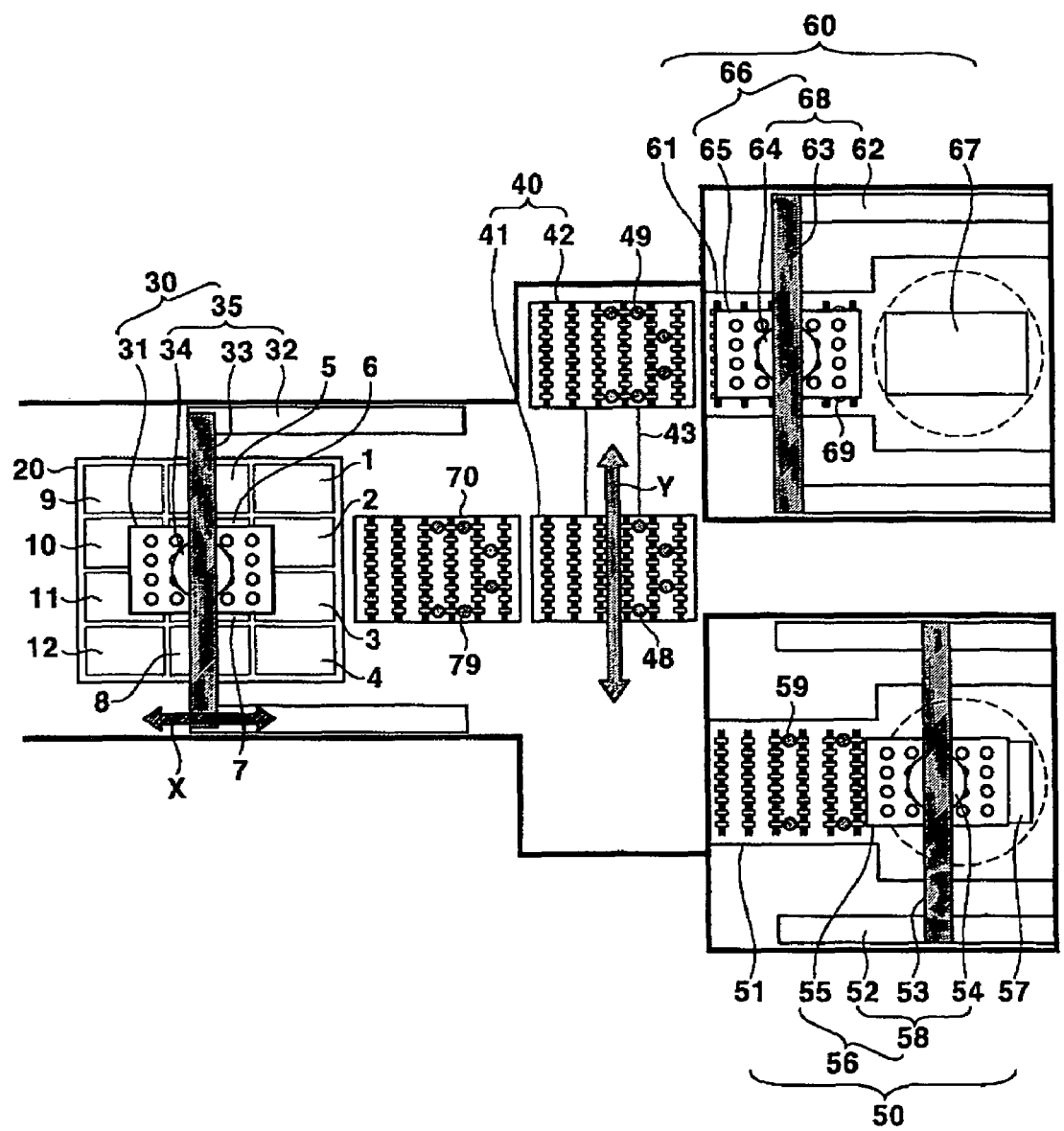
FIG. 1 is a plan view of a distribution system according to an embodiment of the present invention.

FIG. 1 is a plan view of a distribution system according to an embodiment of the present invention. As shown in FIG. 1, this distribution system includes a plate 20, a first transfer assembly 30 for transferring substrates 1 through 12 loaded on plate 20 to a conveyer 70, and a distribution assembly 40 for distributing the substrates delivered by conveyer 70 to a first testing assembly 50 and a second testing assembly 60.

In one embodiment, the distribution system of the present invention is provided between a scribing process for dividing a motherboard into a plurality of substrates and an edge grinding process for grinding corners of the substrates. In this system, the substrates move along one line after the scribing process and are distributed to two process lines for the subsequent edge grinding process.

Plate 20 is formed in a rectangular shape in one example, similar to a conveyer shape, and the plurality of substrates 1 through 12 are loaded thereon. It is noted that plate 20 may be formed to have various shapes. The plurality of substrates 1 through 12 are separated from a large-size panel (i.e., the motherboard) by the scribing process, and each substrate corresponds to a cell, which corresponds to a liquid crystal display (LCD) panel. Referring to FIG. 1, substrates 1 through 12 are loaded on the conveyer-shaped plate 20. Substrates 1 through 4 are systematically arranged at the right column, substrates 5 through 8 are systematically arranged at the center column, and substrates 9 through 12 are systematically arranged at the left column.

First transfer assembly 30 includes a vacuum pad 31 for engaging the substrates via suction in a vacuum state, and a transfer part 35 for moving vacuum pad 31 horizontally, vertically, and rotatably. Preferably, vacuum pad 31 is configured so that its suction portions are each capable of engaging and not engaging according to the scale of the substrate.

Transfer part 35 includes a pair of horizontal arms 32 parallel to each other, an X-axis slider 33 supported by horizontal arms 32 and movable in the X-direction, and a Y-axis slider 34 associated with X-axis slider 33 and movable in the Y-direction along the X-axis slider 33. Y-axis slider 34 is rotatably associated with vacuum pad 31 and may rotate vacuum pad 31 by about 360 degrees. Vacuum pad 31 may be moved in horizontal, vertical, and rotatable directions substantially simultaneously in one embodiment.

Distribution assembly 40 includes a first sub-conveyer 41 and a second sub-conveyer 42 which are connected by a connection bar 43. In one example, first sub-conveyer 41 and second sub-conveyer 42 are statically positioned to be a set distance from one another. Sub-conveyers 41 and 42 can thus move in parallel in the Y-direction along a common vertical axis, reciprocating between receiving a substrate (when a sub-conveyer inlet is inline with or corresponds to the outlet of conveyer 70) and delivering a substrate (when a sub-conveyer outlet is inline with or corresponds to the inlet of a testing conveyer 51 or 61.)

First testing assembly 50 includes a first testing conveyer 51 for receiving the substrate from first sub-conveyer 41, a first testing part 57 which is positioned adjacent to an outlet of first testing conveyer 51 for checking the state of (or otherwise processing) the substrate, and a second transfer assembly 50 for transferring the substrate from first testing conveyer 51 to first testing part 57.

Second testing assembly 60 includes a second testing conveyer 61 for receiving the substrate from second sub-conveyer 42, a second testing part 67 which is positioned at the rear of second testing conveyer 61 for checking the state of the substrate, and a third transfer assembly 66 for transferring the substrate from second testing conveyer 61 to second testing part 67.

The outlet of conveyer 70 corresponds to (i.e., is inline with) an inlet of one of the first and second sub-conveyers 41 and 42. The outlet of one of the first and second sub-conveyers 41 and 42 corresponds to (i.e., is inline with) the inlet of one of the first and second testing assemblies 50 and 60.

Accordingly, when the outlet of first sub-conveyer 41 corresponds to the inlet of first testing conveyer 51 by the vertical motion of distribution assembly 40, the inlet of second sub-conveyer 42 corresponds to the outlet of conveyer 70. Whereas, when the outlet of second sub-conveyer 42 corresponds to the inlet of second testing conveyer 61, the inlet of first sub-conveyer 41 corresponds to the outlet of conveyer 70.

Preferably, conveyer 70, first and second sub-conveyers 41 and 42, and first and second testing conveyers 51 and 61 are belt type conveyers or roller type conveyers and individually include arrangement elements 79, 48, 49, 59, and 69. Arrangement elements 79, 48, 49, 59, and 69 each include a plurality of pushers disposed at substantially the sides and outlet of each conveyer. The pushers arrange the substrate on the conveyer by pushing it.

Also, a substrate reversing mechanism may be further included in this distribution system. That is, when a lower substrate is delivered to the distribution system in a way that it is directed upward, reversion of the lower substrate is necessary so that the first and second testing assemblies 50 and 60 may check the state of the substrate. At this time, the substrate reversing mechanism performs such a reversion.

Hereinafter, a method for operating the above-mentioned distribution system will be described.

Figure 2:
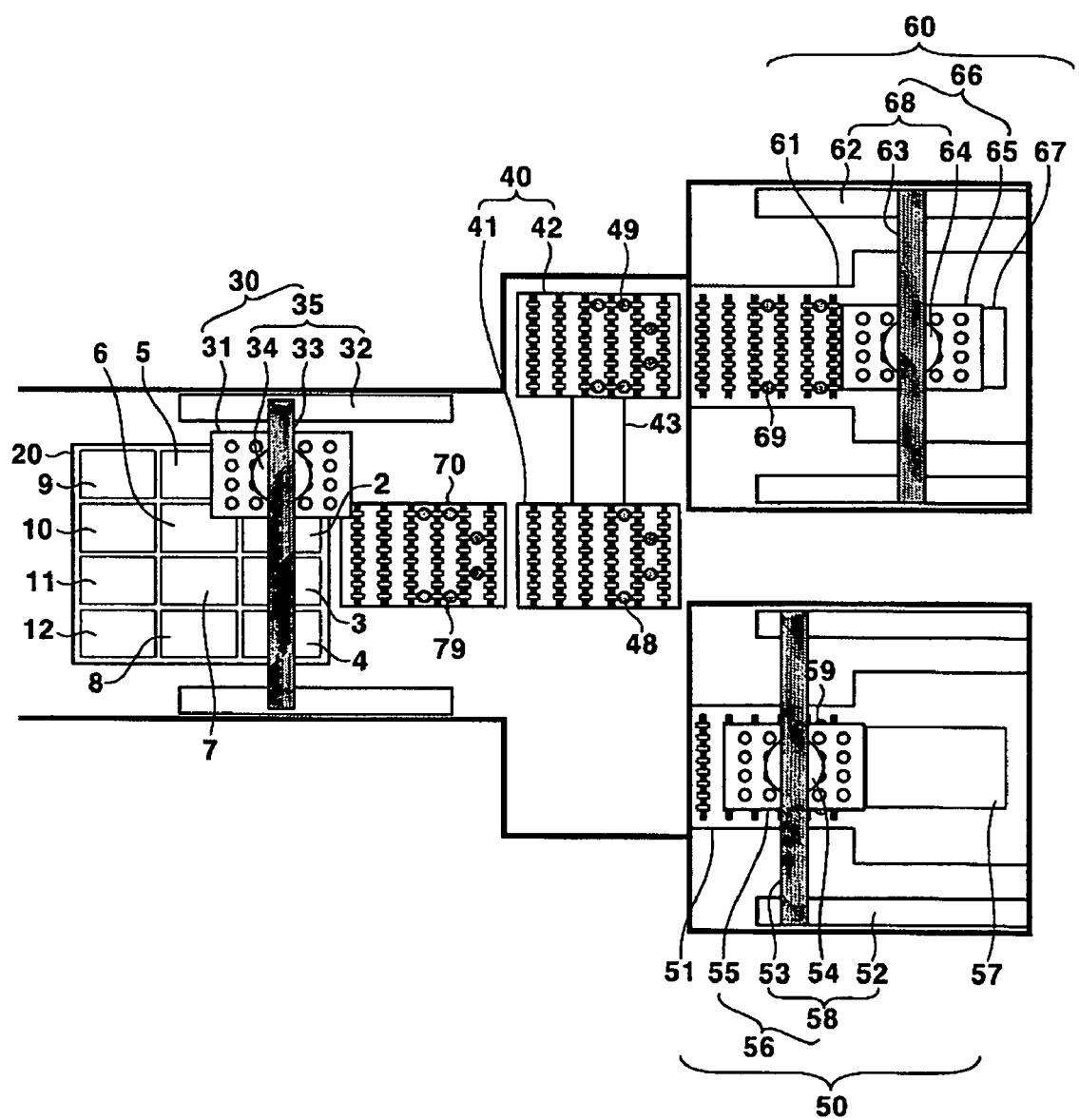
FIG. 2 through FIG. 10 are plan views showing stages in a method of operating a distribution system according to an embodiment of the present invention.

Initially, as shown in FIG. 2, first transferring assembly 30 is positioned over and ready to transfer substrate 1 (FIG. 1). At this step, the outlet of second sub-conveyer 42 corresponds to the inlet of second testing conveyer 61, and the inlet of first sub-conveyer 41 corresponds to the outlet of conveyer 70.

Figure 3:
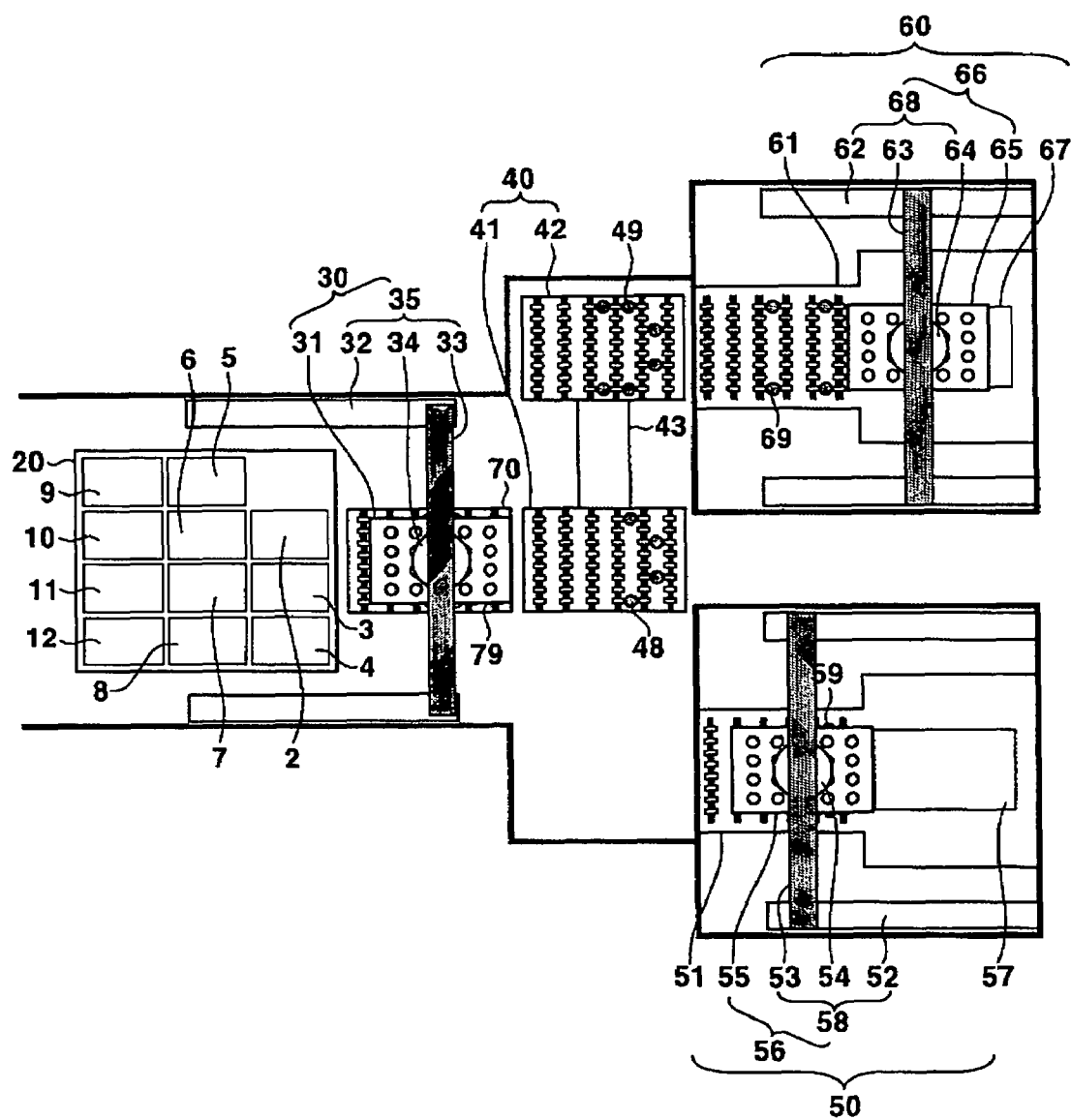

Subsequently, as shown in FIG. 3, first transfer assembly 30 engages substrate 1 using vacuum pad 31 and then transfers substrate 1 to conveyer 70. First substrate 1 is then released from the vacuum suction state, thereby being disposed on conveyer 70. Arrangement elements 79 of conveyer 70 suitably adjust the position of substrate 1 on conveyer 70.

Figure 4:
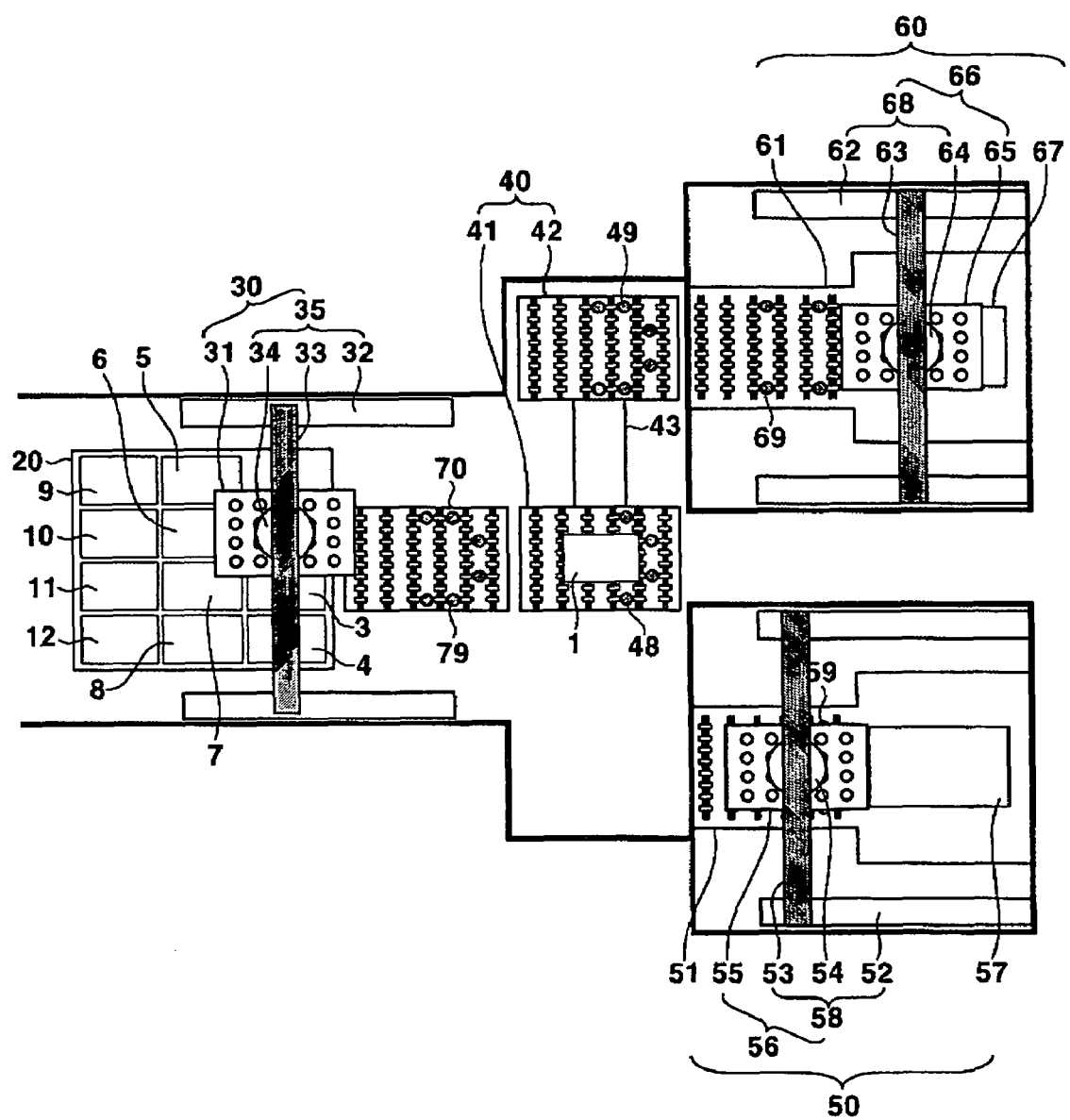

Subsequently, as shown in FIG. 4, substrate 1 is transferred from conveyer 70 to first sub-conveyer 41 when the outlet of the conveyer 70 corresponds to inlet of first sub-conveyer 41. Substantially simultaneously, first transfer assembly 30 is positioned over and ready to transfer second substrate 2.

Figure 5:
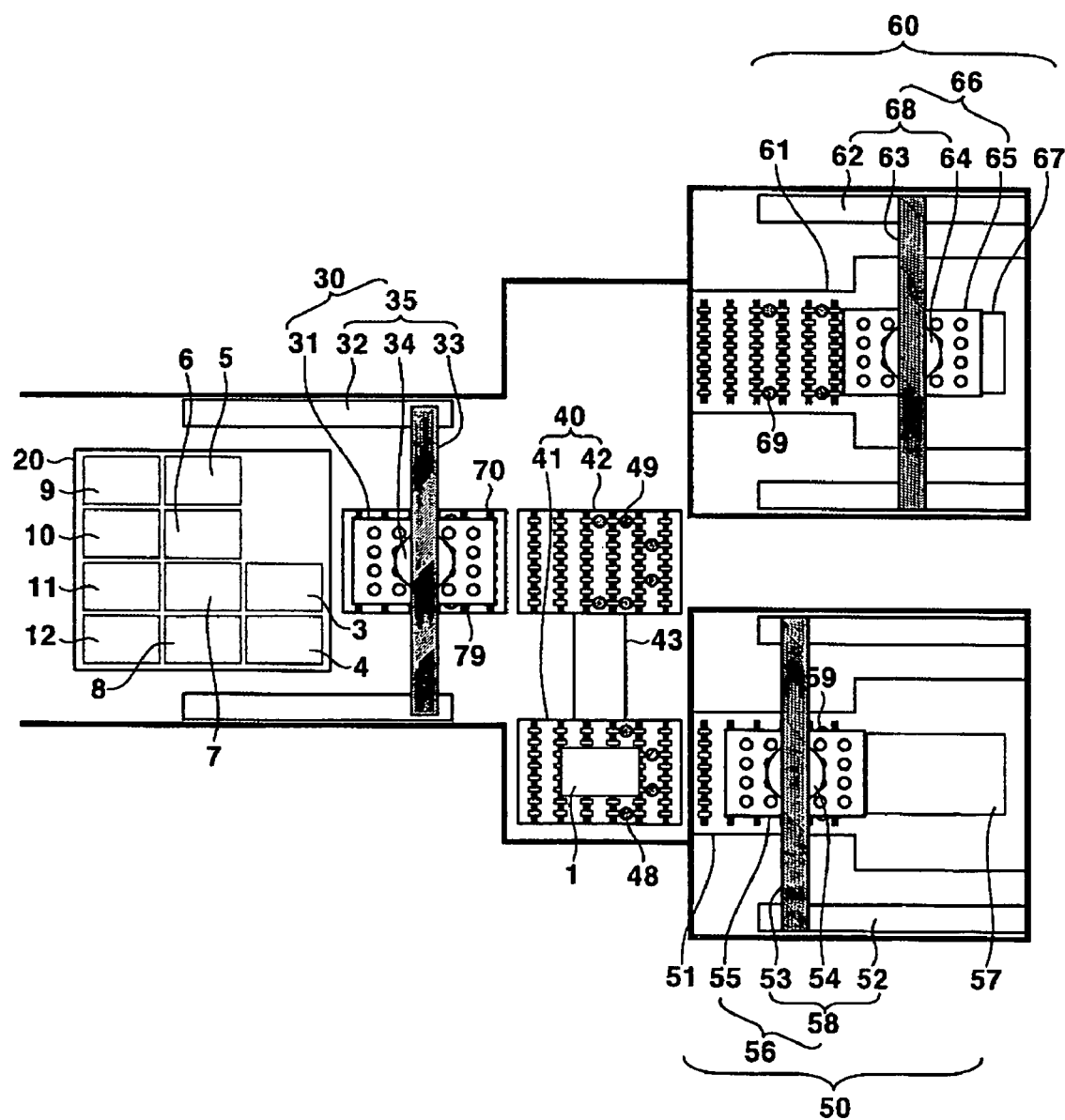

Subsequently, as shown in FIG. 5, after arrangement elements 48 of first sub-conveyer 41 suitably adjust the position of first substrate 1 on first sub-conveyer 41, distribution assembly 40 is transferred in the downward Y-direction so that the outlet of first sub-conveyer 41 corresponds to the inlet of first testing conveyer 51 while the inlet of second sub-conveyer 42 corresponds to the outlet of conveyer 70. This is to directly place substrate 1 from first sub-conveyer 41 in line with first testing conveyer 51 without adjusting the position of substrate 1. Substrate 1 then moves from the inlet portion of first sub-conveyer 41 to the outlet portion. Substantially simultaneously, first transfer assembly 30 suctions substrate 2 using vacuum pad 31, and then transfers substrate 2 to conveyer 70. Substrate 2 is then released from the vacuum suction state, thereby being disposed on conveyer 70.

Figure 6:
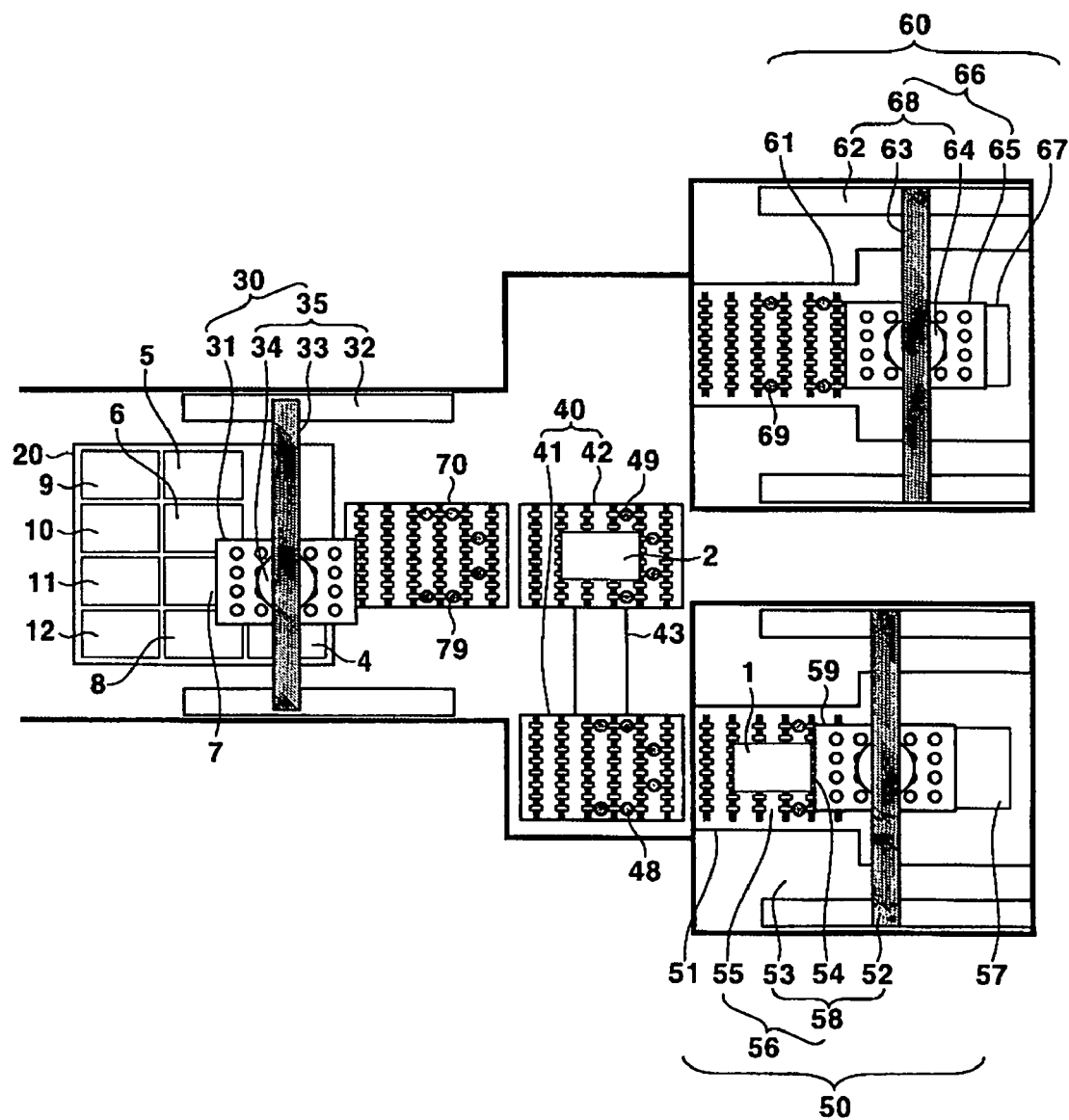

Subsequently, as shown in FIG. 6, substrate 1 is horizontally transferred to first testing conveyer 51 by first sub-conveyer 41. Substantially simultaneously, substrate 2 is transferred from conveyer 70 to second sub-conveyer 42 when the outlet of conveyer 70 corresponds to the inlet of second sub-conveyer 42. Substantially simultaneously, first transfer assembly 30 is positioned over and ready to transfer substrate 3.

Figure 7:
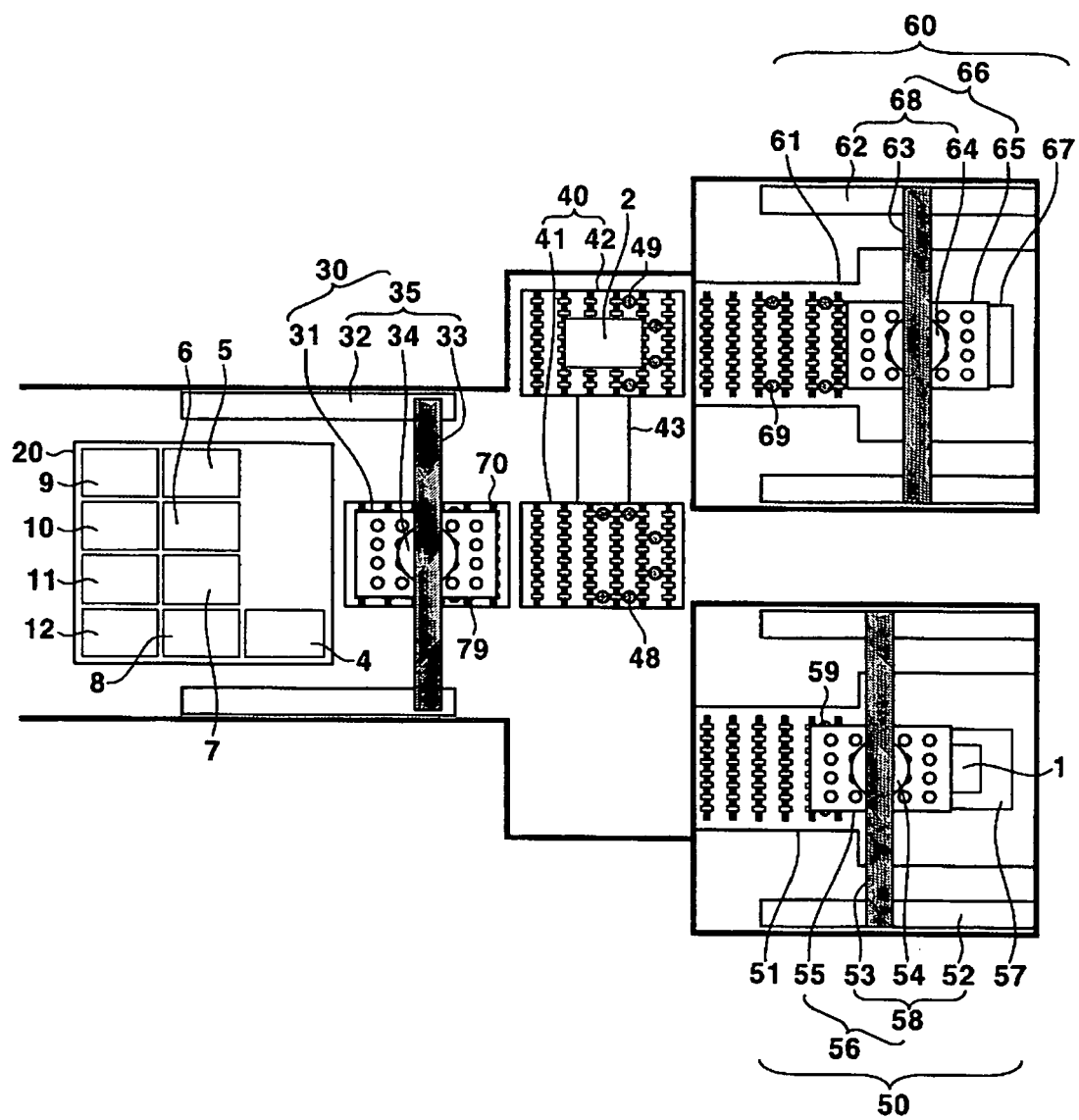

Subsequently, as shown in FIG. 7, second transfer assembly 56 transfers substrate 1 from first testing conveyer 51 to first testing part 57. In more detail, second transfer assembly 56 vacuum suctions first substrate 1 using vacuum pad 55, and then transfers substrate 1 to first testing part 57 for processing (e.g., testing). Substrate 1 is then released from the vacuum suction state, thereby being disposed on first testing part 57.

Second transfer assembly 56 includes vacuum pad 55 for performing vacuum suction/engagement of the substrate, and transfer part 58 for transferring vacuum pad 55 horizontally, vertically, and rotatably. Transfer part 58 includes two horizontal arms 52 parallel to each other, the X-axis slider 53 supported by horizontal arms 52 and movable in the X-direction, and the Y-axis slider 54 associated with the X-axis slider 53 and movable along the X-axis slider 53 in the Y-direction. The Y-axis slider 54 is rotatably associated with vacuum pad 55 and may rotate vacuum pad 55 by about 360 degrees. Vacuum pad 55 may be moved in horizontal, vertical, and rotatable directions substantially simultaneously in one embodiment.

Substantially simultaneously, after arrangement elements 49 of second sub-conveyer 42 suitably adjust the position of substrate 2 on second sub-conveyer 42, distribution assembly 40 is transferred in the upward Y-direction so that the outlet of second sub-conveyer 42 corresponds to the inlet of second testing conveyer 61 while the inlet of first sub-conveyer 41 corresponds to the outlet of conveyer 70.

Figure 8:
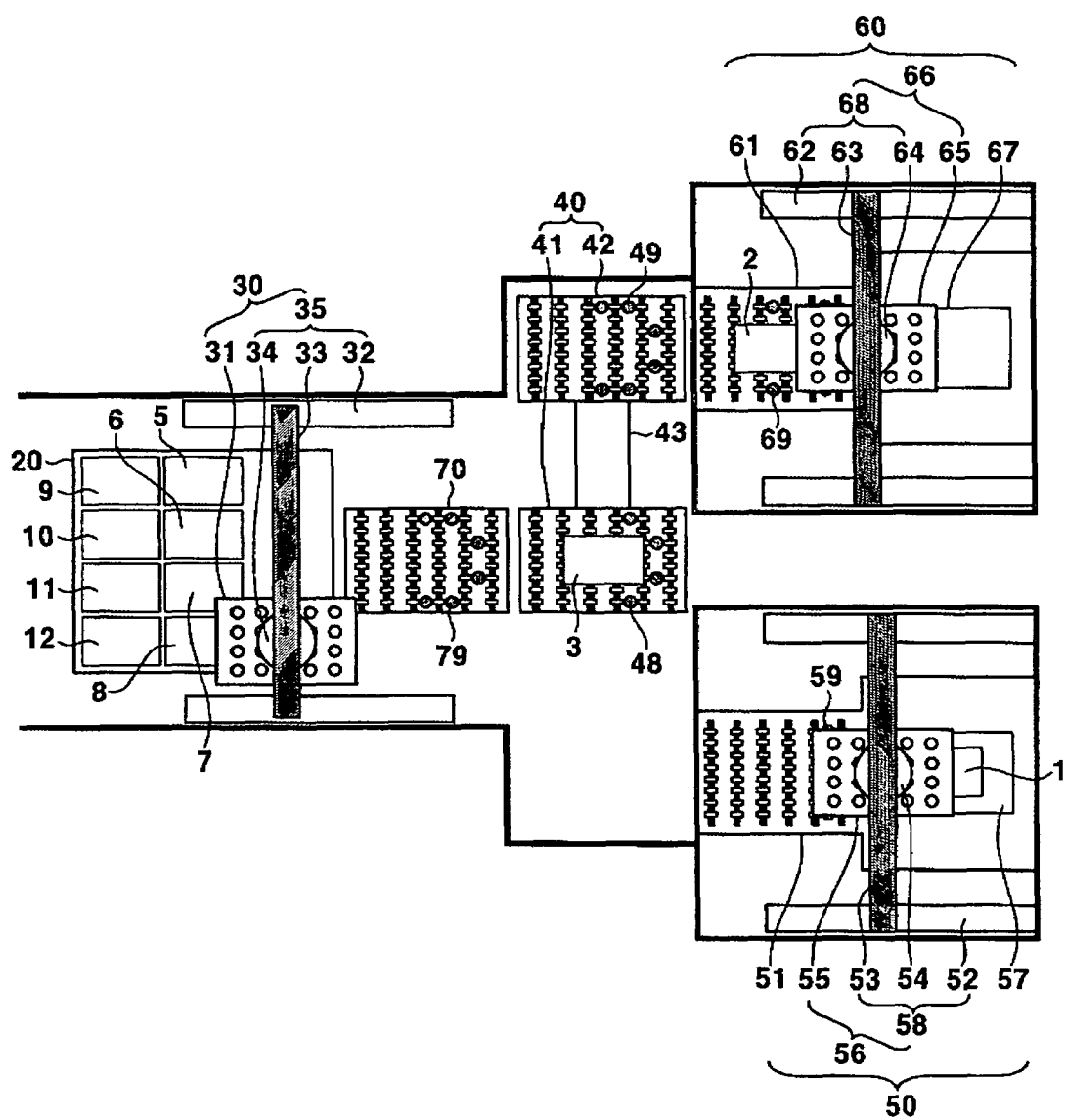

Substantially simultaneously, first transfer assembly 30 suctions the substrate 3 using vacuum pad 31, and then transfers it to conveyer 70. Substrate 3 is then released from the vacuum suction/engagement state, thereby being disposed on conveyer 70. Subsequently, as shown in FIG. 8, first testing part 57 checks the state of substrate 1, namely, whether the substrate is cut by the preceding scribing process according to specifications and whether any crack exists in the substrate. Substantially simultaneously, substrate 2 is horizontally transferred to second testing conveyer 61 by second sub-conveyer 42. Substantially simultaneously, substrate 3 is transferred from conveyer 70 to first sub-conveyer 41 when the outlet of conveyer 70 corresponds to the inlet of first sub-conveyer 41. Substantially simultaneously, first transfer assembly 30 is positioned over and ready to transfer substrate 4.

Figure 9:
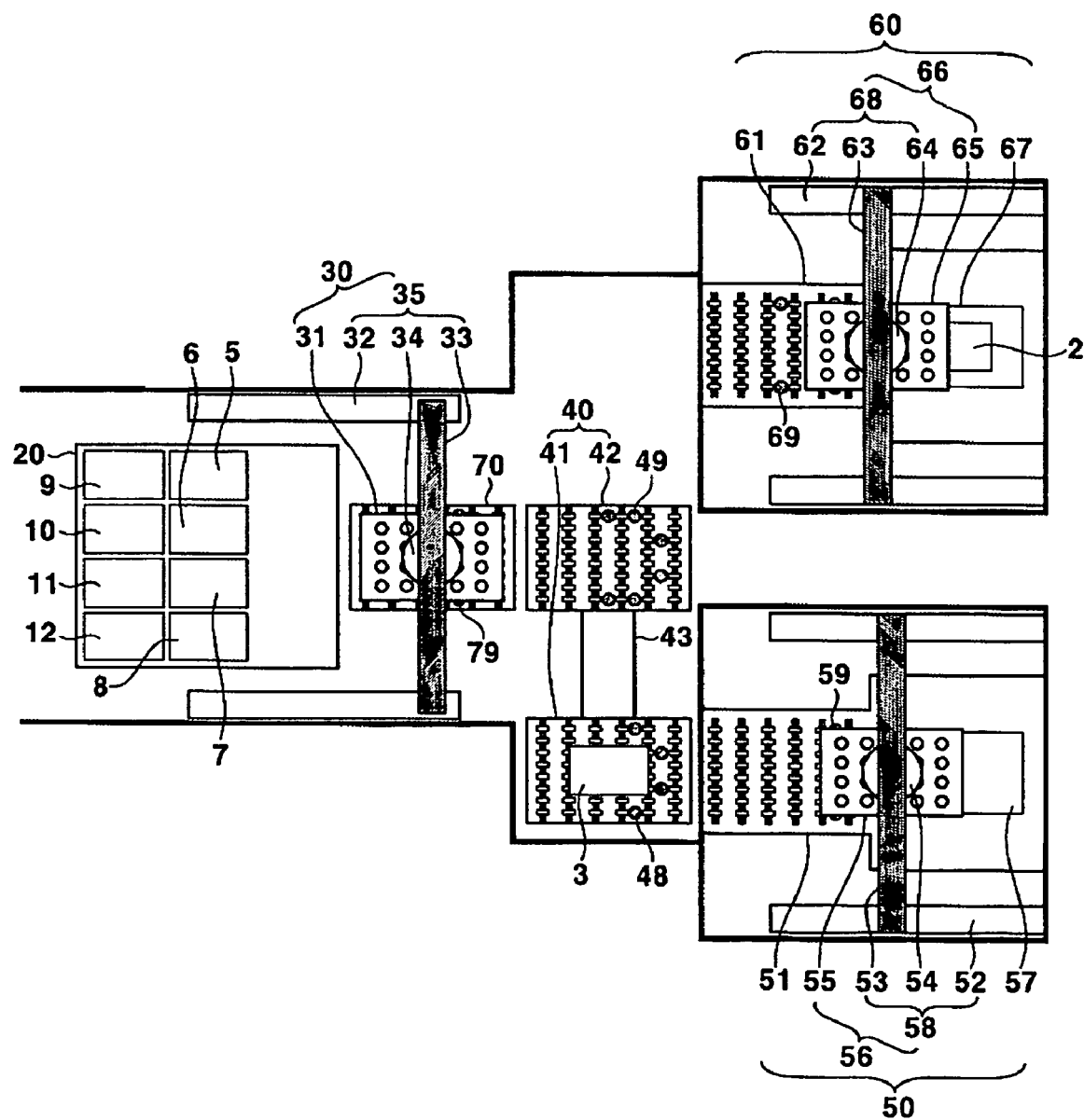

Subsequently, as shown in FIG. 9, substrate 1 is transferred to another process line, such as an edge grinder process line. Substantially simultaneously, third transfer assembly 66 transfers substrate 2 from second testing conveyer 61 to second testing part 67. In more detail, third transfer assembly 66 vacuum suctions/engages substrate 2 using vacuum pad 65, and then transfers substrate 2 to second testing part 67. Substrate 2 is then released from the vacuum suction/engagement state, thereby being disposed on second testing part 67.

Third transfer assembly 66 includes vacuum pad 65 for performing vacuum suction/engagement of the substrate, and transfer part 68 for transferring vacuum pad 65 horizontally, vertically, and rotatably. Transfer part 68 includes two horizontal arms 62 parallel to each other, X-axis slider 63 supported by horizontal arms 62 and movable in the X-direction, and Y-axis slider 64 associated with X-axis slider 63 and vertically movable in the Y-direction along X-axis slider 63. Y-axis slider 64 is rotatably associated with vacuum pad 65 and may rotate vacuum pad 63 by about 360 degrees. Vacuum pad 63 may be moved in horizontal, vertical, and rotatable directions substantially simultaneously in one embodiment.

Substantially simultaneously, after arrangement elements 48 of first sub-conveyer 41 suitably adjust the position of substrate 3 on first sub-conveyer 41, distribution assembly 40 is transferred in the downward Y-direction so that the outlet of first sub-conveyer 41 corresponds to the inlet of first testing conveyer 51 while the inlet of second sub-conveyer 42 corresponds to the outlet of conveyer 70.

Substantially simultaneously, first transfer assembly 30 suctions/engages substrate 4 using vacuum pad 31, and then transfers substrate 4 to conveyer 70. Substrate 4 is then released from the vacuum suction/engagement state, thereby being disposed on conveyer 70.

Figure 10:
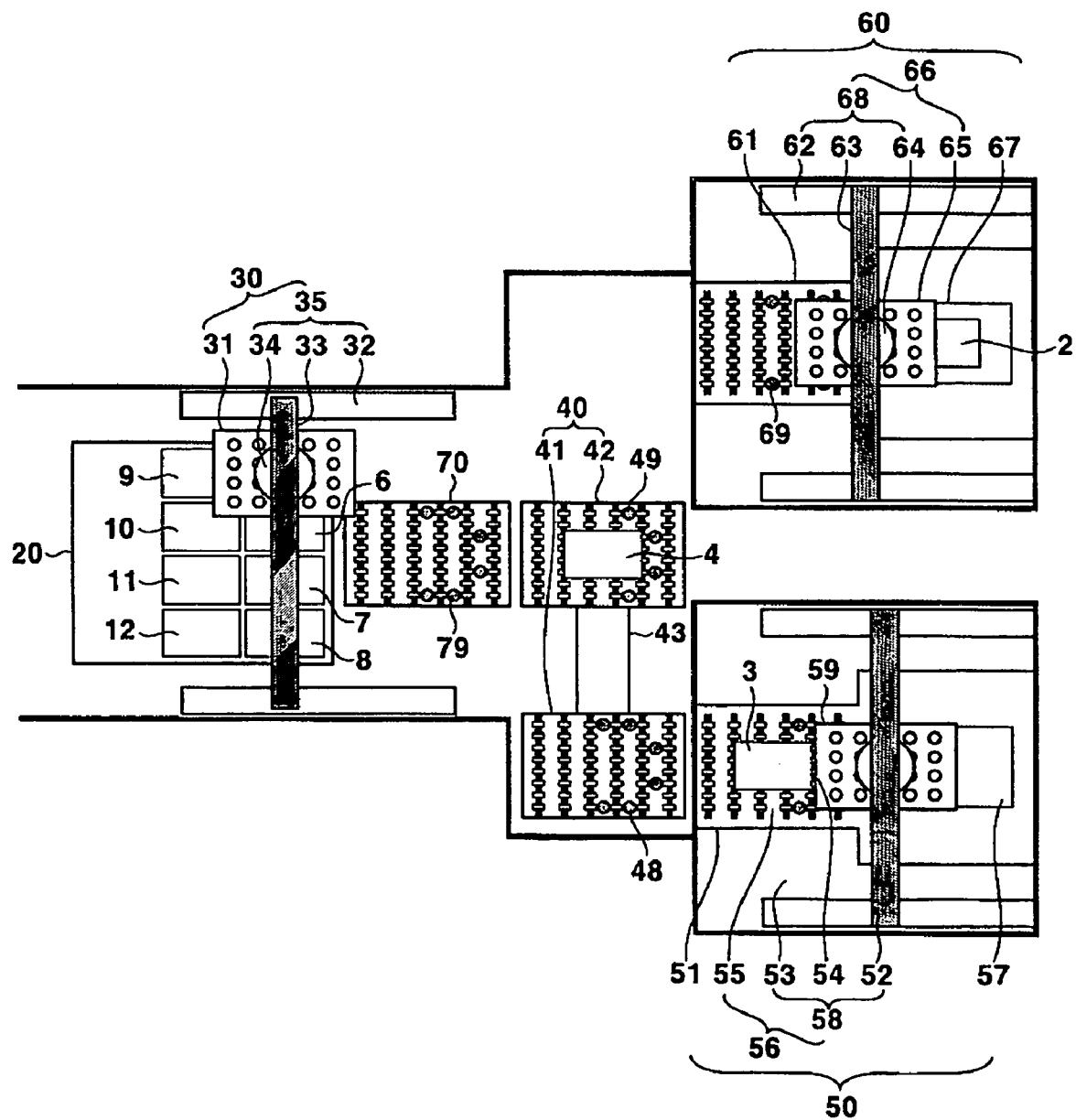

Subsequently, as shown in FIG. 10, second testing part 67 checks the state of substrate 2 similar to that which was done on substrate 1. Substantially simultaneously, substrate 3 is horizontally transferred to first testing conveyer 51 by first sub-conveyer 41. Substantially simultaneously, substrate 4 is transferred from conveyer 70 to second sub-conveyer 42 when the outlet of conveyer 70 corresponds to the inlet of second sub-conveyer 42. Substantially simultaneously, all of the substrates 5 through 8 of the center column may be optionally transferred forward to shorten a movement distance of first transfer assembly 30. Substantially simultaneously, first transfer assembly 30 is positioned over and ready to transfer substrate 5.

The operation of the distribution system continues in a way that the above-mentioned steps are repeated for transferring and processing substrates 5 through 8. As a result, the substrates supplied from one line are distributed into two lines by distribution assembly 40, so that the tact time is reduced.

In the conventional art, since the transfer assembly directly supplies the substrates to two lines, similar to first testing assembly 50 and second assembly 60, the transfer distance of the transfer assembly in total is relatively longer and thus the tact time increases. However, in the distribution system of the present invention, the transfer assembly does not directly supply the substrates to first testing assembly 50 and second testing assembly 60, and the substrates are distributed into two lines by the vertical reciprocating motion of distribution assembly 40. Accordingly, the transfer distance of the transfer assembly is shortened and the tact time is thus reduced.

Hereinafter, such a reduction of the tact time will be described in more detail.

In the case of 19-inch and 49-inch substrates, the time it takes to transfer vacuum pad 31 downwardly is 1 second, the time it takes to perform the vacuum engagement between vacuum pad 31 and the substrate is 0.4 second, and the time it takes to return vacuum pad 31 to the original position is 1 second. Accordingly, the vertical motion time of first transfer assembly 30 to take one substrate totals about 2.4 seconds.

Then, the horizontal transfer and rotary transfer of vacuum pad 31 are substantially simultaneously executed. In this case, a total transfer time of vacuum pad 31 is determined by a horizontal transfer time since it is larger than a rotary transfer time. The transfer time of vacuum pad 31 of the first transfer assembly 30 is 2.0 seconds when the substrate is 19 inches, while being 2.7 seconds when the substrate is 46 inches. Accordingly, the time for one reciprocating motion of first assembly 30 between a substrate receiving position and a substrate delivering position becomes about 4.0 seconds (for the 19-inch substrate) or about 5.4 seconds (for the 46-inch substrate).

Also, in the 19-inch and 49-inch substrates, the time it takes to vertically transfer first transfer assembly 30 for supplying the substrate to conveyer 70 is about 2.2 seconds which is the sum of a downward transfer time of vacuum pad 31 (1 second), a vacuum releasing time between vacuum pad 31 and the substrate (0.2 second), and an upward transfer time of vacuum pad 31 (1 second).

Accordingly, the total tact time of the first transfer assembly 30 is about 8.6 seconds (for the 19-inch substrate), or about 10 seconds (for the 49-inch substrate).

When distribution assembly 40 moves in the Y-direction, simultaneously, the substrates may be transferred from the inlets of first sub-conveyer 41 and second sub-conveyer 42 to the outlets thereof. In this case, the time it takes to transfer the substrate from the inlet to the outlet of first sub-conveyer 41 or second sub-conveyer 42 is about 9.3 seconds, while the time it takes to transfer distribution assembly 40 in the Y-direction is about 4.6 seconds. Accordingly, the tact time of distribution assembly 40 is determined by the substrate transfer time on first sub-conveyer 41 and second sub-conveyer 42 since this time is larger than the vertical transfer time of distribution assembly 40.

Thus, the tact time of the distribution system becomes about 9.3 seconds or about 10 seconds on the basis of the tact time of first transfer assembly 30 (8.6 seconds or 10 seconds) and the tact time of distribution assembly 40 (9.3 seconds). Accordingly, the tact time of the distribution system substantially corresponds to the tact time of the scribing process since the tact time of the scribing process is about 10 seconds when the substrate is 17 inches or about 12 seconds when the substrate is 19 inches, thereby reducing bottleneck created in the distribution system.

Another distribution system according to a second embodiment of the present invention will now be described with reference to FIG. 11 through FIG. 13. Hereinafter, reference numerals and characters identical to those which were previously referred to represent like elements. The second embodiment is differentiated from the first embodiment in that two substrates are transferred at the same time so as to shorten by a half the tact time of first transfer assembly 30.

Figure 11:
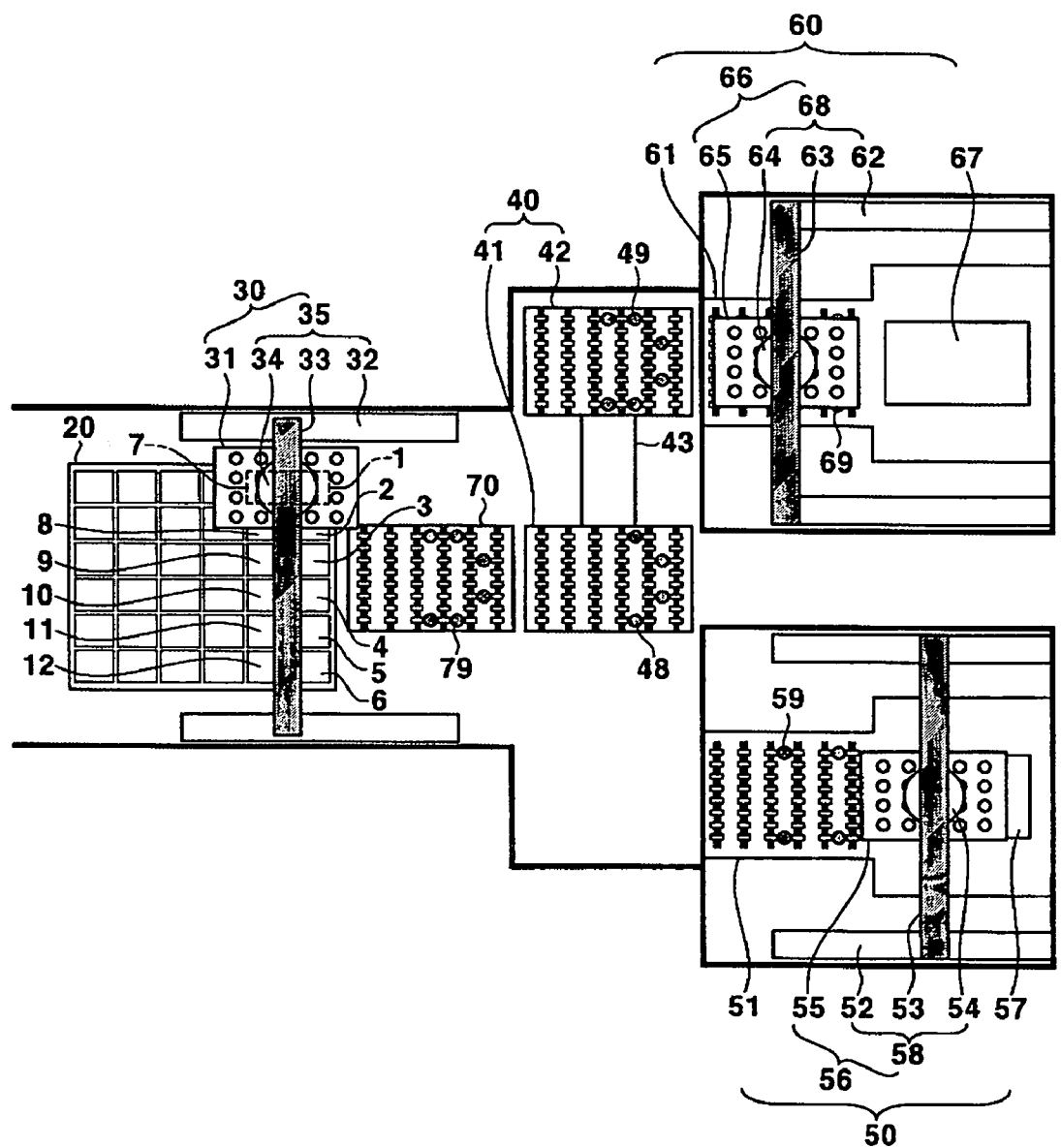
FIG. 11 through FIG. 13 are plan views showing stages in a method of operating a distribution system according to another embodiment of the present invention.

As shown in FIG. 11, a plurality of substrates 1 through 36 are disposed on conveyer-shaped plate 20 (e.g., rectangular). Substrates 1 through 36 are separated from a large-size panel (called a motherboard) by the scribing process. Substrates 1 through 6 are systematically arranged at the rightmost column, and substrates 7 through 12 are systematically arranged at the next column.

As shown in FIG. 11, first transfer assembly 30 is initially transferred on substrates 1 and 7. At this step, the outlet of second sub-conveyer 42 corresponds to the inlet of second testing conveyer 61 while the inlet of first sub-conveyer 41 corresponds to the outlet of conveyer 70.

Figure 12:
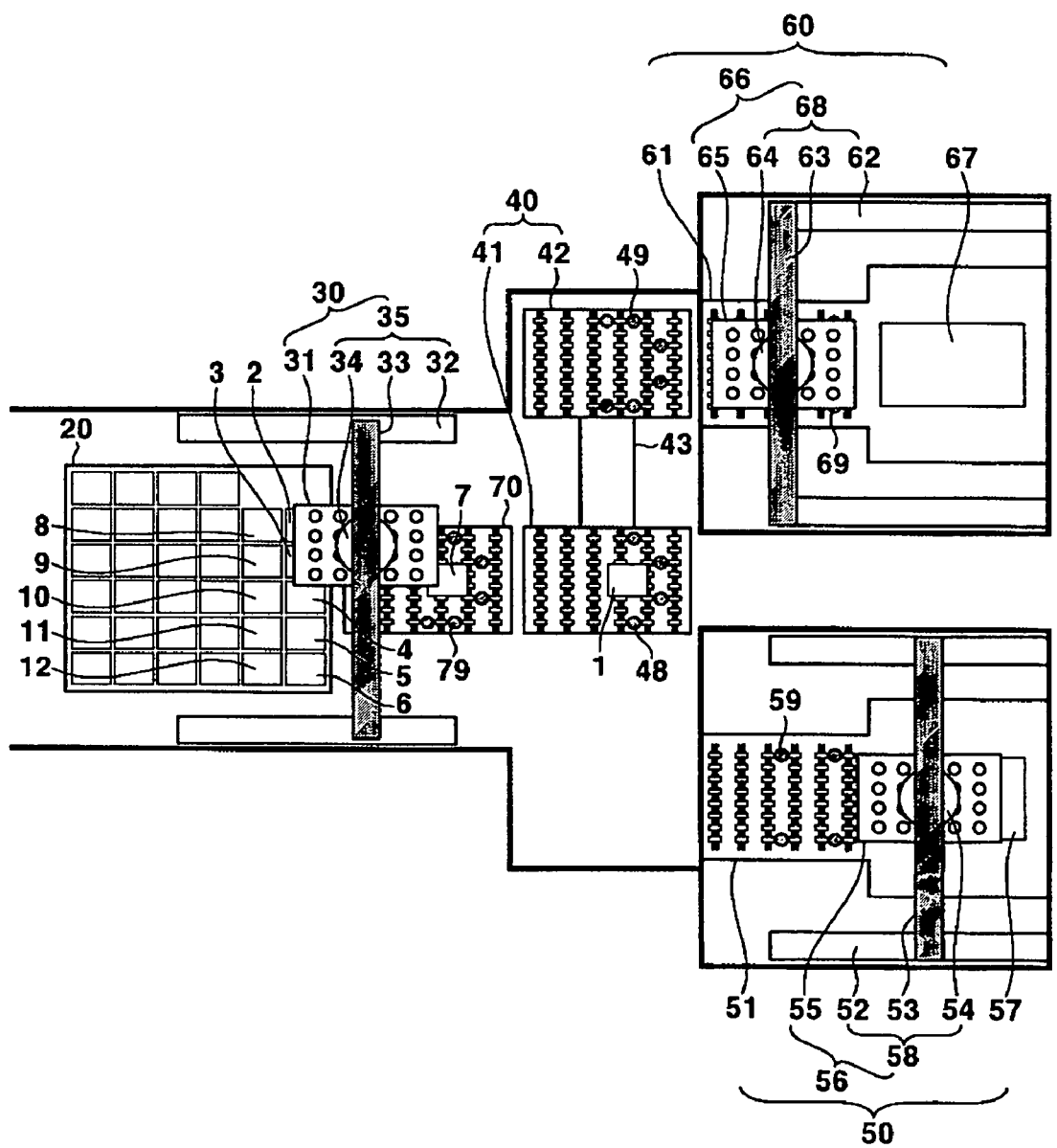

Subsequently, as shown in FIG. 12, first transfer assembly 30 simultaneously suction engages two substrates 1 and 7 using vacuum pad 31, and transfers them to conveyer 70. Substrate 1 is then released from the vacuum suction/engagement state by the partial operation of vacuum pad 31 (i.e., suction holding only substrate 1 is released), thereby being disposed on conveyer 70. Subsequently, arrangement elements 79 of conveyer 70 suitably adjust the position of substrate 1 on conveyer 70. Subsequently, substrate 1 is transferred from conveyer 70 to first sub-conveyer 41 when the inlet of first sub-conveyer 41 corresponds to the outlet of conveyer 70.

Subsequently, substrate 7 is released from the vacuum suction/engagement state by the partial operation of vacuum pad 31 (i.e., suction holding only substrate 7 is released), thereby being disposed on conveyer 70. Subsequently, arrangement elements 79 of the conveyer 70 suitably adjust the position of substrate 7 on conveyer 70. Substantially simultaneously, first transfer assembly 30 is positioned over and ready to transfer substrates 2 and 8.

Figure 13:
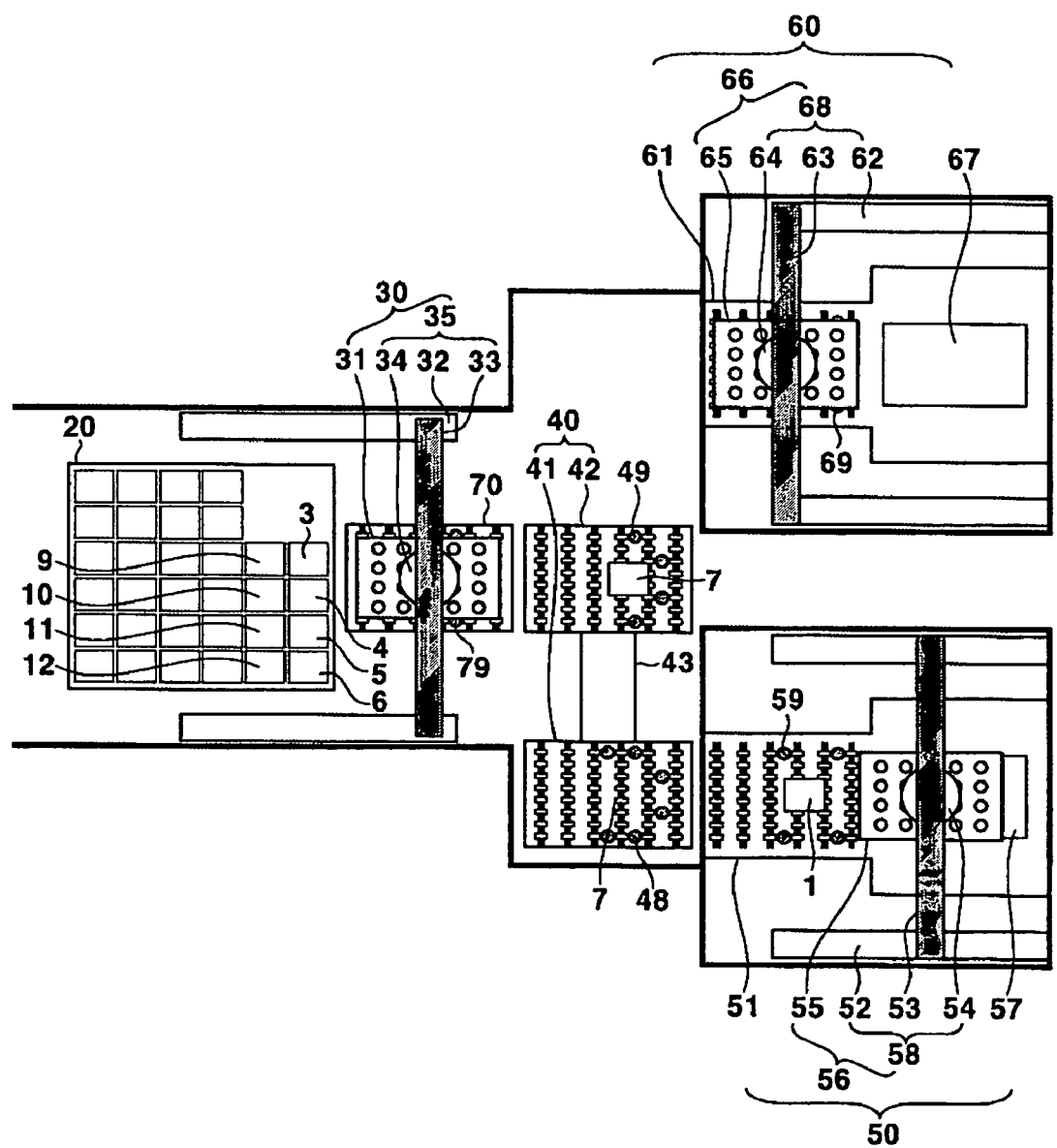

Subsequently, as shown in FIG. 13, after arrangement elements 48 of first sub-conveyer 41 suitably adjust the position of substrate 1 on first sub-conveyer 41, distribution assembly 40 is transferred in the downward Y-direction so that the outlet of first sub-conveyer 41 corresponds to the inlet of first testing conveyer 51 while the inlet of second sub-conveyer 42 corresponds to the outlet of conveyer 70. This is to directly place substrate 1 from first sub-conveyer 41 inline with first testing conveyer 51 without adjusting the position of substrate 1.

Subsequently, substrate 1 is horizontally transferred onto first testing conveyer 51 from first sub-conveyer 41. At about the same time, substrate 7 is transferred from conveyer 70 to second sub-conveyer 42 when the outlet of conveyer 70 corresponds to the inlet of second sub-conveyer 42.

Substantially simultaneously, first transfer assembly 30 suction engages substrates 2 and 8 (FIG. 12) using vacuum pad 31, and then transfers them to conveyer 70. Substrate 2 is then released from the vacuum suction/engagement state by the partial operation of vacuum pad 31 (i.e., suction holding only substrate 2 is released), thereby being disposed on conveyer 70.

As mentioned above, in the second embodiment of the present invention, first transfer assembly 30 takes two substrates at the same time and then transfers them onto conveyer 70, thereby shortening the tact time of first transfer assembly 30 by about half.

Still another distribution system according to a third embodiment of the present invention will now be described with reference to FIG. 14 through FIG. 16. Hereinafter, reference numerals and characters identical to those which were previously referred to represent like elements. The third embodiment is differentiated from the first and second embodiments in that vacuum pad 31 of first transfer assembly 30 takes two substrates at the same time and turns by about 90 degrees before being transferred, thereby shortening the tact time of first transfer assembly 30 by about half.

Figure 14:
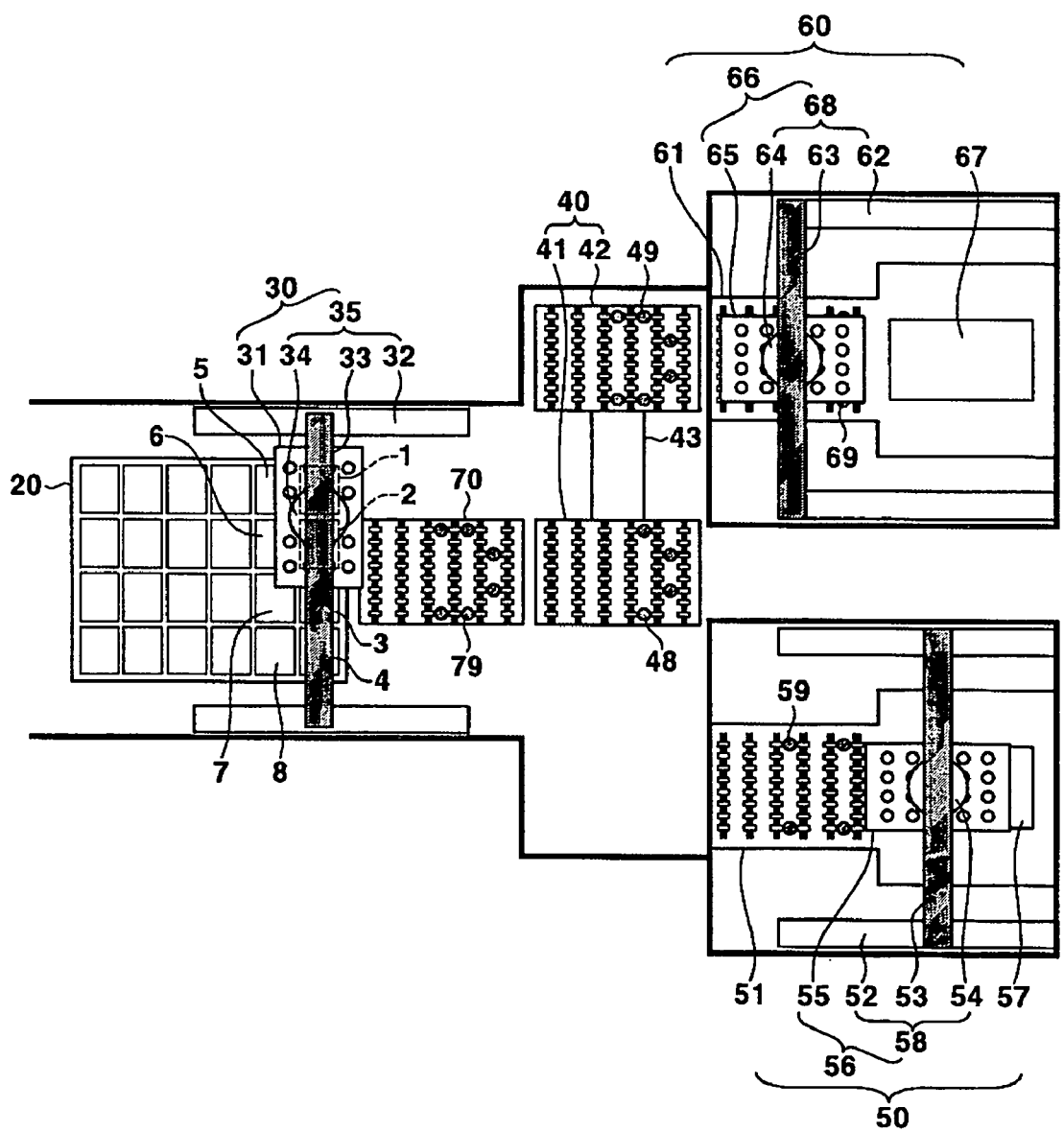
FIG. 14 through FIG. 16 are plan views showing stages in a method of operating a distribution system according to another embodiment of the present invention.

As shown in FIG. 14, a plurality of substrates 1 through 24 are disposed on plate 20. Substrates 1 through 24 are separated from a large-size panel called a motherboard by the scribing process. Substrates 1 through 4 are systematically arranged at the rightmost column, substrates 5 through 8 are systematically arranged at the next column, and so on.

As shown in FIG. 14, first transfer assembly 30 is initially positioned over and ready to transfer on substrates 1 and 2.

Figure 15:
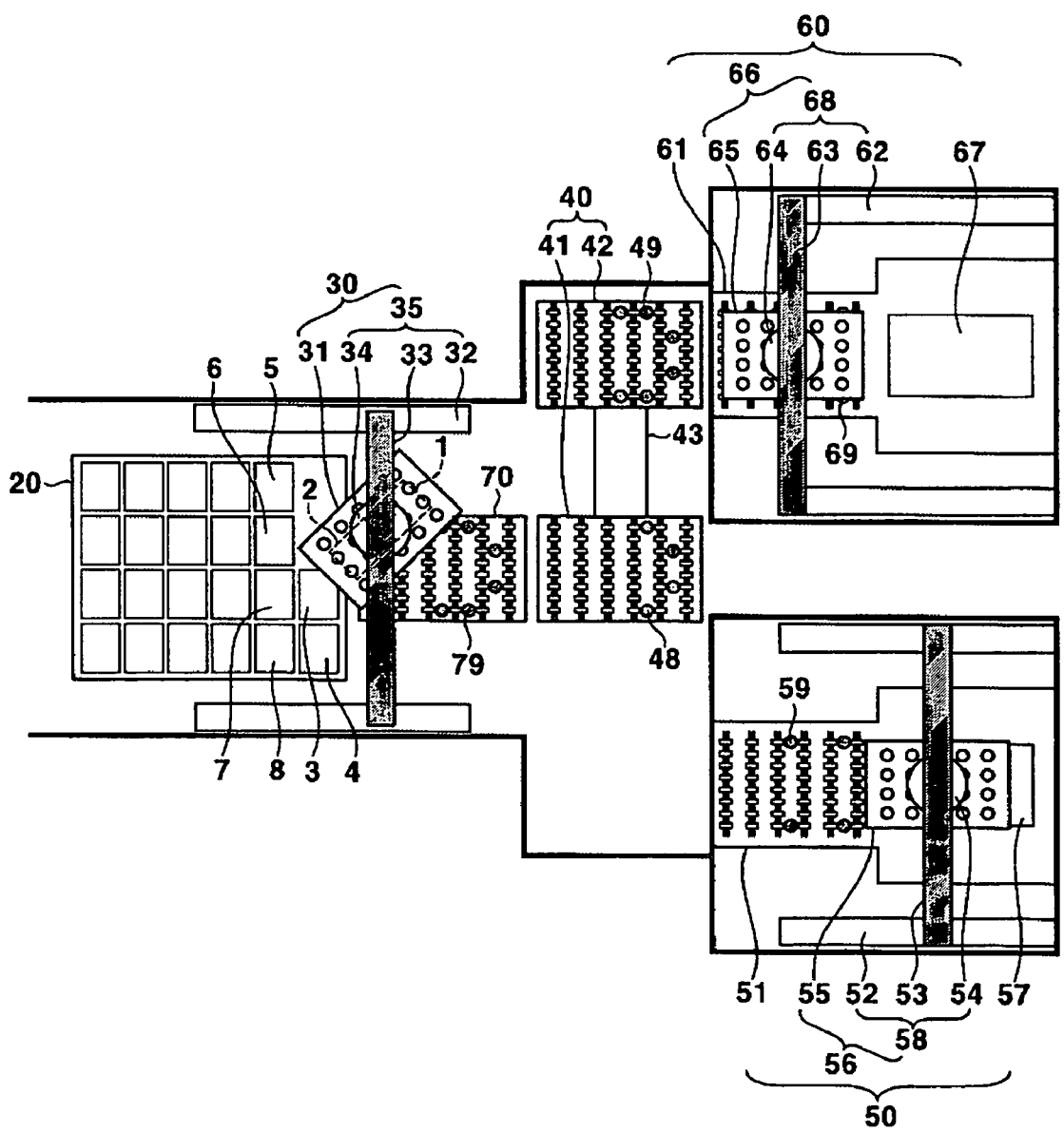

Subsequently, as shown in FIG. 15, first transfer assembly 30 simultaneously suction engages substrates 1 and 2 using vacuum pad 31, and transfers them to conveyer 70 after rotating vacuum pad 31 by about 90 degrees. In this case, the transfer distance between first transfer assembly 30 and conveyer 70 is shortened and the tact time of the transfer assembly is also shortened.

Figure 16:
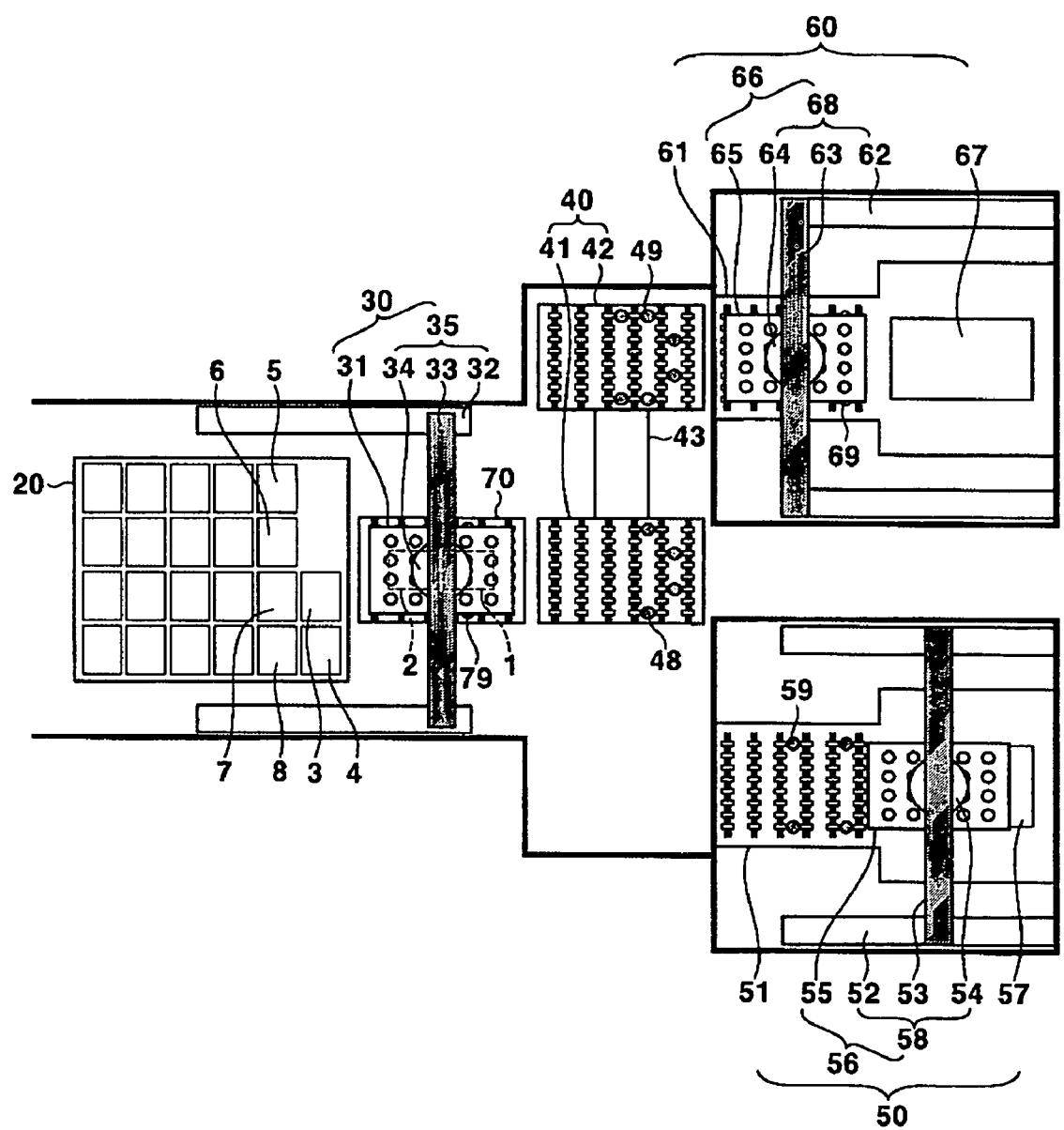

Subsequently, as shown in FIG. 16 substrate 1 is released from the vacuum suction/engagement state by the partial operation of vacuum pad 31, (i.e., suction holding only substrate 1 is released) thereby being disposed on conveyer 70. Subsequently, substrate 1 is transferred from conveyer 70 to first sub-conveyer 41 when the inlet of first sub-conveyer 41 corresponds to the outlet of conveyer 70. Subsequently, substrate 2 is released from the vacuum suction/engagement state by the partial operation of vacuum pad 31 (i.e., suction holding only substrate 2 is released), thereby being disposed on conveyer 70.

The tact time of the system when two substrates are transferred at about the same time will now be described.

In a 19-inch substrate, the time it takes to transfer the substrate using first transfer assembly 30 is about 8.6 seconds. The time it takes to suitably arrange the substrate on conveyer 70 is about 1 second. The time it takes to transfer substrate 1 from conveyer 70 to distribution assembly 40 is about 3.3 seconds. The time it takes to vertically transfer first transfer assembly 30 for supplying substrate 7 on conveyer 70 is about 2.2 seconds which is the sum of a downward transfer time of vacuum pad 31 (about 1 second), a vacuum releasing time between vacuum pad 31 and substrate 7 (about 0.2 second), and an upward transfer time of vacuum pad 31 (about 1 second). Accordingly, in the 19-inch substrate, the total tact time of first transfer assembly 30 is about 7.5 seconds (calculated by 8.6+2.2+1.0+3.3/2 seconds).

In this embodiment, a front portion and a rear potion of vacuum pad 31 are capable of operating separately to transfer two substrates at the same time.

In conclusion, according to the present invention, the distribution assembly including two sub-conveyers efficiently distributes the substrates supplied from one line into two lines, thereby shortening the tact time. Advantageously, the transfer assembly of the present invention transfers the substrates by vertical transfer and rotary motion, thereby shortening the tact time. By applying the distribution assembly of the present invention, even though a motherboard is divided into an odd number of substrates, the edge grinding equipment nevertheless can be used without a lowering of efficiency. Also, two substrates may be transferred at the same time when the substrates are relatively small, thereby shortening the tact time.

The present invention should not be considered limited to the particular examples described above, but rather should be understood to cover all aspects of the invention as set out in the attached claims. Various modifications, equivalent processes, as well as numerous structures to which the present invention may be applicable will be apparent to those of skill in the art to which the present invention is directed upon review of the instant specification.

What is claimed is:

1. A distribution system, comprising:
    a first transfer assembly for transferring substrates from a plate to a conveyer; and
    a distribution assembly for distributing the substrates transferred by the conveyer to a first testing assembly or a second testing assembly,
    wherein the distribution assembly includes a first sub-conveyer and a second sub-conveyer, an outlet of one of the first sub-conveyer and the second sub-conveyer corresponding to an inlet of one of the first testing assembly and the second testing assembly, wherein the first sub-conveyer and the second sub-conveyer of the distribution assembly are connected in parallel by a connection bar and adapted to be adjacent to one another.

2. The distribution system of claim 1, wherein the distribution assembly moves along a vertical direction.

3. The distribution system of claim 1, wherein an inlet of one of the first sub-conveyer and the second sub-conveyer corresponds to an outlet of the conveyer.

4. The distribution system of claim 3, wherein the inlet of the second sub-conveyer corresponds to the outlet of the conveyer when the outlet of the first sub-conveyer corresponds to the inlet of a first testing conveyer, while the inlet of the first sub-conveyer corresponds to the outlet of the conveyer when the outlet of the second sub-conveyer corresponds to the inlet of a second testing conveyer.

5. A distribution system, comprising:
    a first transfer assembly for transferring substrates from a plate to a conveyer; and
    a distribution assembly for distributing the substrates transferred by the conveyer to a first testing assembly or a second testing assembly,
    wherein the distribution assembly includes a first sub-conveyer and a second sub-conveyer, an outlet of one of the first sub-conveyer and the second sub-conveyer corresponding to an inlet of one of the first testing assembly and the second testing assembly,
    wherein the first testing assembly includes a first testing conveyer for receiving the substrates from the first sub-conveyer, a first testing part positioned at an outlet of a first testing conveyer for processing the substrates, and a second transfer assembly for transferring the substrates from the first testing conveyer to the first testing part, and
    wherein the second testing assembly includes a second testing conveyer for receiving the substrates from the second sub-conveyer, a second testing part positioned at an outlet of a second testing conveyer for processing the substrates, and a third transfer assembly for transferring the substrates from the second testing conveyer to the second testing part.

6. The distribution system of claim 5, wherein each of the first transfer assembly, the second transfer assembly, and the third transfer assembly includes a vacuum pad for suction engaging the substrates in the vacuum state, and a transfer part for moving the vacuum pad horizontally, vertically, and rotatably.

7. The distribution system of claim 6, wherein the inlet of the second sub-conveyer corresponds to the outlet of the conveyer when the outlet of the first sub-conveyer corresponds to the inlet of the first testing conveyer, while the inlet of the first sub-conveyer corresponds to the outlet of the conveyer when the outlet of the second sub-conveyer corresponds to the inlet of the second testing conveyer.

8. The distribution system of claim 5, wherein the conveyer, the first sub-conveyer, the second sub-conveyer, the first testing conveyer, and the second testing conveyer individually include arrangement elements.

9. A method for operating a distribution system including a distribution assembly having a first sub-conveyer and a second sub-conveyer, the method comprising:
  (a) providing a first transfer assembly on a first substrate which is disposed on a plate;
  (b) transferring the first substrate to a conveyer using the first transfer assembly;
  (c) transferring the first substrate to the first sub-conveyer when an outlet of the conveyer corresponds to an inlet of the first sub-conveyer, while substantially simultaneously moving the first transfer assembly onto a second substrate;
  (d) vertically moving the distribution assembly so that an outlet of the first sub-conveyer corresponds to an inlet of a first testing conveyer and an inlet of the second sub-conveyer corresponds to the outlet of the conveyer, while substantially simultaneously transferring the second substrate to the conveyer using the first transfer assembly; and
  (e) horizontally transferring the first substrate to the first testing conveyer for subsequent processing.

10. The method of claim 9, further comprising: (e) horizontally transferring the first substrate to the first testing conveyer, while substantially simultaneously, transferring the second substrate to the second sub-conveyer when the outlet of the conveyer corresponds to the inlet of the second sub-conveyer, and moving the first transfer assembly onto a third substrate.

11. The method of claim 10, further comprising: (f) transferring the first substrate to a first testing part using a second transfer assembly, while substantially simultaneously, vertically transferring the distribution assembly so that the outlet of the second sub-conveyer corresponds to the inlet of the second testing conveyer and the inlet of the first sub-conveyer corresponds to the outlet of the conveyer, and transferring the third substrate to the conveyer using the first transfer assembly.

12. The method of claim 11, further comprising: (g) processing the first substrate using the first testing part, while substantially simultaneously, horizontally transferring the second substrate to the second testing conveyer, transferring the third substrate to the first sub-conveyer when the outlet of the conveyer corresponds to the inlet of the first sub-conveyer, and moving the first transfer assembly onto a fourth substrate.

13. The method of claim 12, further comprising: (h) transferring the first substrate to a subsequent process line, while substantially simultaneously, transferring the second substrate to a second testing pail using a third transfer assembly, vertically transferring the distribution assembly so that the outlet of the first sub-conveyer corresponds to the inlet of the first testing conveyer and the inlet of the second sub-conveyer corresponds to the outlet of the conveyer, and transferring the fourth substrate to the conveyer using the first transfer assembly.

14. The method of claim 13, further comprising: (i) processing the second substrate using the second testing part, while substantially simultaneously, horizontally transferring the third substrate to the first testing conveyer, transferring the fourth substrate to the second sub-conveyer when the outlet of the conveyer corresponds to the inlet of the second sub-conveyer, and moving the first transfer assembly onto a fifth substrate.

15. A method for operating a distribution system which includes a distribution assembly having a first sub-conveyer and a second sub-conveyer, the method comprising:
  (a) providing a first transfer assembly on a first substrate and a second substrate;
  (b) suction engaging the first substrate and the second substrate using a vacuum pad of the first transfer assembly and transferring the first substrate and the second substrate to a conveyer;
  (c) disposing the first substrate on the conveyer by releasing the suction engaging the first substrate;
  (d) transferring the first substrate to the first sub-conveyer when an outlet of the conveyer corresponds to an inlet of the first sub-conveyer,
  (e) disposing the second substrate on the conveyer by releasing the suction engaging the second substrate, and substantially simultaneously moving the first transfer assembly onto a third substrate and a fourth substrate;
  (f) vertically moving the distribution assembly so that an outlet of the first sub-conveyer corresponds to an inlet of a first testing conveyer while an inlet of the second sub-conveyer corresponds to the outlet of the conveyer; and
  (g) horizontally transferring the first substrate to the first testing conveyer for subsequent processing.

16. The method of claim 15, wherein the first transfer assembly performs a horizontal transfer and a rotary motion at about the same time.

17. The method of claim 15, further comprising: (g) horizontally transferring the first substrate to the first testing conveyer using the first sub-conveyer, while substantially simultaneously, transferring the second substrate to the second sub-conveyer using the conveyer when the outlet of the conveyer corresponds to the inlet of the second sub-conveyer.

18. The method of claim 17, further comprising: (b) suction engaging the third substrate and the fourth substrate using the vacuum pad of the first transfer assembly, and transferring the third substrate and the fourth substrate to the conveyer.

19. The method of claim 18, further comprising: (i) horizontally transferring the second substrate to the second testing conveyer for subsequent processing.

* * * * *